United States Patent [19]

Moshier et al.

[11] Patent Number: 4,917,964
[45] Date of Patent: Apr. 17, 1990

[54] POROUS METAL-SECOND PHASE COMPOSITES

[75] Inventors: William C. Moshier, Pasadena; John M. Brupbacher; Leontios Christodoulou, both of Baltimore; Dennis C. Nagle, Ellicott City, all of Md.

[73] Assignee: Martin Marietta Corporation, Bethesda, Md.

[21] Appl. No.: 401,481

[22] Filed: Aug. 30, 1989

Related U.S. Application Data

[60] Continuation of Ser. No. 132,844, Dec. 14, 1987, abandoned, which is a division of Ser. No. 927,014, Nov. 5, 1986, which is a continuation-in-part of Ser. No. 662,928, Oct. 19, 1984, abandoned.

[51] Int. Cl.$^4$ .............................................. C22C 32/00
[52] U.S. Cl. ..................................... 428/614; 148/405
[58] Field of Search ................. 428/614; 148/405–419

[56] References Cited

U.S. PATENT DOCUMENTS

| | | | |
|---|---|---|---|
| 2,852,366 | 9/1958 | Jenkins | 75/232 |
| 3,037,857 | 6/1962 | Conant | 420/552 |
| 3,184,306 | 5/1965 | Fish | 419/19 |
| 3,194,656 | 7/1965 | Vordahl | 420/590 |
| 3,415,697 | 12/1968 | Bredzs et al. | 148/27 |
| 3,547,673 | 12/1970 | Bredzs et al. | 414/10 |
| 3,666,436 | 5/1972 | Bredzs et al. | 75/0.5 BC |
| 3,672,849 | 6/1972 | Bredzs et al. | 75/244 |
| 3,690,849 | 9/1972 | Bredzs et al. | 75/244 |
| 3,690,875 | 9/1972 | Bredzs et al. | 419/12 |
| 3,705,791 | 12/1972 | Bredzs et al. | 75/255 |
| 3,726,643 | 4/1978 | Merzhanov et al. | 423/409 |
| 3,779,714 | 12/1973 | Nadkarni et al. | 75/234 |
| 3,785,807 | 1/1974 | Backerud | 75/68 R |
| 3,858,640 | 1/1975 | Sifferlen | 420/528 |
| 3,877,884 | 4/1975 | Tawarada et al. | 75/232 |
| 3,961,995 | 6/1976 | Alliot et al. | 75/0.5 C |
| 4,161,512 | 7/1979 | Merzhanov et al. | 423/440 |
| 4,431,448 | 2/1984 | Merzhanov et al. | 75/238 |
| 4,444,603 | 4/1984 | Yamatsuta et al. | 148/127 |
| 4,514,268 | 4/1985 | DeAngelis | 204/67 |
| 4,540,546 | 9/1985 | Giessen | 420/590 |
| 4,605,634 | 8/1985 | DeAngelis | 501/96 |
| 4,623,402 | 11/1986 | Maximov et al. | 148/20.3 |
| 4,642,218 | 2/1987 | Rice | 419/11 |
| 4,690,796 | 9/1987 | Paliwal | 75/0.5 BC |
| 4,726,842 | 2/1988 | Reeve et al. | 419/13 |

FOREIGN PATENT DOCUMENTS 0219444 12/1984 Japan .................................... 148/415

OTHER PUBLICATIONS

Hardt, A. P., *Dense Refractories Without Compaction*, Research & Development Div., Lockheed Missiles & Space Company, Inc.

Hardt, A. P. and Holsinger, R. W., "Propagation of Gasless Reactions in Solids-II, Experimental Study of Exothermic Intermetallic Reaction Rates", Lockheed, *Combustion and Flame*, 1973.

Sheppard, Laurel M., Assoc. Editor, "Powders that 'Explode' into Materials", *Advanced Materials & Processes*, Feb., 1986.

Henshaw, William F., Niiler, Andrus, & Leete, Thomas, "Memorandum Report ARBRL-MR-03354, Self-Propagating High-Temperature Synthesis of Ceramics in Vacuum", U.S. Army Armament Research & Development Center, Aberdeen, MD., Apr., 1984.

Hardt, A. P. & Phung, P. V., "Propagation of Gasless Reactions in Solids-I. Analytical Study of Exothermic Intermetallic Reaction Rates", Lockheed Palo Alto Research Lab, Palo Alto, Calif., *Combustion & Flame*, 1973.

Maksimov, Yu. M., Merzhanov, A. G., Pak, A. T., Raskolenko, L. G. and Braverman, B. Sh., "Mechanism of Product Structure Formation in Processes of Self-Propagating High-Temperature Synthesis", Plenum Publishing Corp., 1984.

Maksimov, M., Merzhanov, A. G., Pak, A. T., Raskolenko, G. and Braverman, B. Sh., "High Temperature Synthesis of the Ti-B-Te System", Allerton Press, Inc., 1985.

*Primary Examiner*—John P. Sheehan
*Assistant Examiner*—David W. Schumaker
*Attorney, Agent, or Firm*—Herbert W. Mylius; Gay Chin

[57] ABSTRACT

A method is taught for the in-situ precipitation of second phase materials, such as ceramic or intermetallic particles, in a substantial volume fraction of solvent metal matrix. The invention involves the propagating reaction of the second phase-forming constituents in a solvent metal medium to provide a porous composite of finely-dispersed second phase particles in the metal matrix. Exemplary materials include titanium carbide or titanium diboride in an aluminum matrix.

13 Claims, No Drawings

POROUS METAL-SECOND PHASE COMPOSITES

CROSS REFERENCE TO RELATED APPLICATION

This is a continuation of Ser. No. 132,844, filed Dec. 14, 1987, now abandoned, which is a division of Ser. No. 927,014, filed Nov. 5, 1986, which is in turn a continuation-in-part of Ser. No. 662,928 filed Oct. 19, 1984, now abandoned.

BACKGROUND OF THE INVENTION

The present invention comprises a process for the preparation of porous metal second phase composite material using an in-situ precipitation technique involving a propagating reaction wave which is substantially isothermal in the plane of the wave front, and the porous products of that process. In one embodiment, a second phase, such as a ceramic material or an intermetallic, is formed directly in a relatively large volume fraction of metallic or intermetallic solvent matrix, which substantially encapsulates the second phase. The second phase can comprise a ceramic, such as a boride, carbide, oxide, nitride, silicide, sulfide, oxysulfide or other compound, of one or more metals the same as or different than the solvent matrix metal. Of special interest are the intermetallics of aluminum, such as the aluminides of titanium, zirconium, iron, cobalt, and nickel. In the present invention, the second phase is contained in a solvent matrix metal or intermetallic, typically in the form of a porous composite, which can be introduced into a molten host metal bath to disperse the second phase throughout the host metal. Cooling yields a final metal matrix having improved properties due to, for example, uniform dispersion of the second phase throughout the final metal matrix, and fine grain size. Either the solvent matrix metal or the host metal, or both, may constitute an alloy of two or more metals, and the solvent metal may be the same as, or different than, the host metal. The solvent metal should be soluble in the host metal, or capable of forming an alloy or intermetallic therewith.

For the past several years, extensive research has been devoted to the development of metal-second phase composites, such as aluminum reinforced with fibers, whiskers, or particles of carbon, boron, silicon carbide, silica, or alumina. Metal-second phase composites with good high temperature yield strengths and creep resistance have been fabricated by the dispersion of very fine (less than 0.1 micron) oxide or carbide particles throughout the metal or alloy matrix of composites formed, utilizing powder metallurgy techniques. However, such composites typically suffer from poor ductility and fracture toughness, for reasons which are explained below.

Prior art techniques for the production of metal-second phase composites may be broadly categorized as powder metallurgical approaches, molten metal techniques, and internal oxidation processes. The powder metallurgical type production of dispersion-strengthened composites would ideally be accomplished by mechanically mixing metal powders of approximtely 5 micron diameter or less with an oxide or carbide powder (preferably 0.01 micron to 0.1 micron). High speed blending techniques or conventional procedures, such as ball milling, may be used to mix the powders. Standard powder metallurgy techniques are then used to form the final composite. Conventionally, however, the ceramic component is large, i.e. greater than 1 micron, due to a lack of availability, and high cost, of very small particle size materials, because their production is energy intensive, time consuming and capital intensive. Furthermore, production of very small particles inevitably leads to contamination at the particle surface, resulting in contamination at the particle-to-metal interface in the composite, which in turn compromises the mechanical properties thereof. Also, in many cases where the particulate materials are available in the desired size, they are extremely hazardous due to their pyrophoric nature.

Alternatively, molten metal infiltration of a continuous skeleton of the second phase material has been used to produce composites. In some cases, elaborate particle coating techniques have been developed to protect ceramic particles from molten metal during molten metal infiltration and to improve bonding between the metal and ceramic. Techniques such as this have been developed to produce silicon carbide-aluminum composites, frequently referred to as SiC/Al or SiC aluminum. This approach is suitable for large particulate ceramics (for example, greater than 1 micron) and whiskers. The ceramic material, such as silicon carbide, is pressed to form a compact, and liquid metal is forced into the packed bed to fill the intersticies. Such a technique is illustrated in U.S. Pat. No. 4,444,603 to Yamatsuta et al, hereby incorporated by reference. Because this technique necessitates molten metal handling and the use of high pressure equipment, molten metal infiltration has not been a practical process for making metal-second phase composites, especially for making composites incorporating submicron ceramic particles where press size and pressure needs would be excessive and unrealistic.

The presence of oxygen in ball-milled powders used in prior art powder metallurgy techniques, or in molten metal infiltration, can result in a deleterious layer, coating, or contamination such as oxide at the interface of second phase and metal. The existence of such layers will inhibit interfacial bonding between the second phase and the metal matrix, adversely effecting ductility of the composite. Such weakened interfacial contact may also result in reduced strength, loss of elongation, and facilitated crack propagation.

Internal oxidation of a metal containing a more reactive component has also been used to produce dispersion strengthened metals, such as copper containing internally oxidized aluminum. For example, when a copper alloy containing about 3 percent aluminum is placed in an oxidizing atmosphere, oxygen may diffuse through the copper matrix to react with the aluminum, precipitating alumina. Although this technique is limited to relatively few systems, because the two metals must have a wide difference in chemical reactivity, it has offered a possible method for dispersion hardening. However, the highest possible concentration of dispersoids formed in the resultant dispersion strengthened metal is generally insufficient to impart significant changes in properties such as modulus, hardness and the like.

In U.S. Pat. No. 2,852,366 to Jenkins, hereby incorporated by reference, it is taught that up to 10 percent by weight of a metal complex can be incorporated into a base metal or alloy. The patent teaches blending, pressing, and sintering a mixture of a base metal, a compound of the base metal and a non-metallic complexing element, and an alloy of the base metal and the complexing metal. Thus, for example, the reference teaches mixing powders of nickel, a nickel-boron alloy, and a nickel-titanium alloy, pressing, and sintering the mixed powders to form a coherent body in which a stabilizing unprecipitated "complex" of titanium and boron is dispersed in a nickel matrix. Precipitation of the complex phase is specifically avoided.

In U.S. Pat. No. 3,194,656, hereby incorporated by reference, Vordahl teaches the formation of a ceramic phase, such as $TiB_2$ crystallites, by melting a mixture of eutectic or near eutectic alloys. It is essential to the process of Vordahl that at least one starting ingredient has a melting point substantially lower than that of the matrix metal of the desired final alloy. There is no disclosure of the initiation of an exothermic localized second phase-forming reaction forming a moving isothermal wave front at or near the melting point of the matrix metal.

Bredzs et al, in U.S. Pat. Nos. 3,415,697; 3,547,673; 3,666,436; 3,672,849; 3,690,849; 3,690,875; and 3,705,791, hereby incorporated by reference, teach the preparation of cermet coatings, coated substrates, and alloy ingots, wherein an exothermic reaction mechanism forms an in-situ precipitate dispersed in a metal matrix. Bredzs et al rely on the use of alloys having a depressed melting temperature, preferably eutectic alloys, and thus do not initiate a moving localized second phase-forming exothermic reaction at or near the melting temperature of the matrix metal.

DeAngelis, in U.S. Pat. Nos. 4,514,268 and 4,605,634, hereby incorporated by reference, teaches reaction sintered cermets having very fine grain size. The method taught involves the dual effect of reaction between and sintering together of admixed particulate reactants that are shaped and heated at temperatures causing an exothermic reaction to occur, be substantially completed. The reaction products are sintered together to form ceramic-ceramic bonds by holding the reaction mass at the high temperatures attained. Thus, this reference relates to a product with sintered ceramic bonds, suitable for use in contact with molten metal.

Backerud, in U.S. Pat. No. 3,785,807, hereby incorporated by reference, teaches the concept of preparing a master alloy for aluminum-containing titanium diboride. The patentee dissolves and reacts titanium and boron in molten aluminum at a high temperature, but requires that titanium aluminide be crystallized at a lower temperature around the titanium diboride formed.

In recent years, numerous ceramics have been formed using a process termed "self-propagating high-temperature synthesis" (SHS), that involves an exothermic, self-sustaining reaction which propagates through a mixture of compressed powders, generally under externally applied pressure, to form dense products. The SHS process involves mixing and compacting powders of the constituent elements, and locally igniting a portion of a green compact with a suitable heat source. The source can be electrical impulse, laser, thermite, spark, etc. On ignition, sufficient heat is released to support a self-sustaining reaction, which permits the use of sudden, low power initiation of high temperatures when using relatively low concentrations of binder, rather than bulk heating over long periods at lower temperatures. Exemplary of these techniques are the patents of Merzhanov et al, U.S. Pat. Nos. 3,726,643; 4,161,512; and 4,431,448 among others, hereby incorporated by reference.

In most SHS processes, the product is a ceramic, that may be relatively dense for use as a finished body, or may be crushed for use as a powder raw material. In a few instances, binders, such as metal, have been included with the compressed powders, but typically constitute 10 percent or less by weight of the mixture, and almost invariably less than 30 percent. At these levels, the binder acts as a ductile consolidation aid to fill in porosity during the exothermic ceramic production reaction, and to increase the product density. The dense products according to the teachings of the Merzhanov et al. patents are restricted to binder concentrations below about 30 percent by mass, to preserve wear-resistance and hardness, and porosities below 1 percent to avoid impairing operating performance. Further, the SHS process, even in the presence of metal, occurs at higher temperatures than those employed in the present invention, and is not isothermal as is the present invention because significantly lwoer metal concentrations are employed. Thus, the SHS process yields sintered ceramic particles, having substantial variation in size.

In U.S. Pat. No. 3,726,643, there is taught a method for producing high-melting refractory inorganic compounds by mixing at least one metal selected from Groups IV, V, and VI of the Periodic System with a non-metal, such as carbon, boron, silicon, sulfur, or liquid nitrogen, and heating the surface of the mixture to produce a local temperature adequate to initiate a combustion process. In U.S. Pat. No. 4,161,512, a process is taught for preparing titanium carbide by ignition of a mixture consisting of 80-88 percent titanium and 20-12 percent carbon, resulting in an exothermic reaction of the mixture under conditions of layer-by-layer combustion. These references deal with the preparation of ceramic materials, absent a binder.

More particularly, U.S. Pat. No. 4,431,448 teaches preparation of a dense, hard alloy by intermixing powders of titanium, boron, carbon, and a Group I-B binder metal or alloy, such as an alloy of copper or silver, compression of the mixture, local ignition thereof to initiate the exothermic reaction of titanium with boron and carbon, and propagation of the ignition, resulting in an alloy comprising titanium diboride, titanium carbide, and up to about 30 percent binder metal. Upon completion of the exothermic reaction the resulting solid-liquid reaction mass is subjected to compression until a porosity of below 1 percent is obtained. This reference, however, is limited to the use of Group I-B metals and alloys, such as copper and silver, as binders. As mentioned, products made by this method are dense and concentration of the binder is restricted to less than 30 percent to preserve wear resistance and hardness.

Several intermetallic self-sustaining reactions have been studied theoretically to determine propagation rates, as reported in the following two articles: A. P. Hardt and P. V. Phung, *Propagation of Gasless Reactions in Solids—I. Analytical Study of Exothermic Intermetallic Reaction Rates*, Combustion and Flame 21, 77–78 (1973); and A. P. Hardt and R. W. Halsinger, *Propagation of Gasless Reactions in Solids—II. Experimental Study of Exothermic Intermetallic Reaction Rates*, Combustion and Flame 21, 91–97 (1973). Compressed shapes were studied with some binder to cohere the compact. Experimentation concerned exothermic condensed phase reactions and suggested the desirability of low heat transfer to permit heat accumulation in the reaction zone in order to allow reaction propagation. Small particle size reactants were also said to be desirable to permit a high rate of mass transfer, which allows the reaction to go to completion spontaneously. Thus, heat capacity, heat of reaction, and particle size were reported to be important factors. Results showed that increased concentrations of binder were undesirable, particularly concentrations exceeding 30 percent by weight, which retarded ignition and prolonged propagation, contrary to the present invention.

U.S. Pat. No. 4,540,546 to Giessen et al, hereby incorporated by reference, teaches a method for rapid solidification processing of a multiphase alloy. In this process, two starting alloys react in a mixing nozzle in which a "Melt Mix Reaction" takes place between chemically reactable components in the starting alloys to form submicron particles of the resultant compound in the final alloy. The mixing and chemical reaction are performed at a temperature which is at or above the highest liquidus temperature of the starting alloys, but which is also substantially below the liquidus temperature of the final alloy, and as close to the solidus temperature of the final alloy as possible. While dispersion-strengthened alloys can be produced by this technique, there appear to be a number of inherent difficulties. First, processing is technically complex, requiring multiple furnaces. Second, efficient mixing is important if fine dispersions are to be consistently produced. Lastly, very high degrees of superheat will be required to completely dissolve the rapid solidification alloying elements in order to produce high loading of dispersoid, which necessarily accentuates particle growth, for example, in composites containing 10–20 percent dispersoid.

The present invention overcomes the disadvantages of the prior art. More particularly, the present invention permits simplification of procedures and equipment compared to the prior art. For example, the present process obviates need for multiple furnaces and mixing and control equipment because all of the reactive constituents of the second phase are present in a single reaction mass, in the presence of large concentrations of solvent metal. The present invention also overcomes the need for forming multiple melts of components at very high melting temperatures. Further, high loading composites can be prepared without the necessity of achieving high levels of superheat in holding furnaces. Applicants' invention also provides for a cleaner particle/metal interface compared with conventional metal-ceramic composites made by techniques using, for example, separate metal and ceramic powders, because the reinforcing particles are formed in-situ and encapsulated with solvent metal. Moreover, the porous products formed can be dissolved to make uniform dispersions of substantially unagglomerated particles in a matrix, with controlled volume fractions of second phase materials. With these facts in mind, a detailed description of the invention follows, which achieves advantages over known processes.

SUMMARY OF THE INVENTION

It is an object of the present invention to provide an inexpensive method for forming porous composite materials, containing finely dispersed second phase, such as a particulate ceramic, intermetallic material, or mixtures thereof, in metal, metallic alloy, or intermetallic matrices.

The present invention produces a porous composite comprising a reltively concentrated second phase dispersion in a solvent metal matrix, which may be the same or different than the final metal matrix desired. This concentrated composite may be utilized to form improved final metal matrix composites of lower second phase concentration, having substantially uniform dispersion and uniform particle size distribution, by admixture with a molten bath of the desired host metal, metal alloy or intermetallic matrix material, or by admixture with solid host metal, metal alloy, or intermetallic, followed by heating to a temperature above the melting point of the host metal.

For purposes of simplifying further description, the matrix of the porous composite material produced directly by the method of the present invention shall be referred to as the "solvent metal matrix," while the metal with which the porous composite may be admixed shall be referred to as the "host metal." The metal of the final composites resulting from such admixture may be referred to as "final metal matrix". In each instance, the word "metal" shall encompass the alloys and intermetallic compounds thereof. Further, the solvent metal may encompass not only metals in which the second phase-forming constituents are soluble, but also such metals in combination with other metals. Other metals may include those in which said constituents are not soluble, but in which said solvent metal is soluble, or which are soluble in said solvent metal. Thus, "solvent metal" may refer to a combination of solvent metals and nonsolvent metals.

It is a further object of this invention to provide a method for dispersion hardening of metals and alloys. The present invention relates to the preparation of a porous composite, said porous composite comprising a second phase particulate in a solvent metal matrix, such as titanium diboride or titanium carbide in an aluminum matrix, using a moving, substantially isothermal, wave front effecting localized in-situ precipitation of second phase material in relatively large volume fractions of solvent metal to make porous products which can be used to form materials having substantially uniform distribution of second phase material. The term "relatively large volume fractions of solvent metal" as used herein shall refer to the presence of at least 10 percent solvent, preferably more than 20 volume percent, and most preferably more than 30 percent solvent metal. When the volume percentage of second phase material exceeds 70 percent, the second phase particles will generally be in contact with each other purely by geometric considerations, i.e. there is less than 30 volume percent free space in a close-packed array of dispersoids. Accordingly, the incidence of interparticle sintering increases substantily as the volume fraction of the second phase increases above 70 volume percent in some systems. Thus, it is preferred that the second phase constitute less than about 70 volume percent of the composite.

The present invention relates to a process for the localized in-situ precipitation of up to less than about 90 percent by volume of a second phase material in a solvent metal matrix, wherein the second phase can comprise a ceramic, such as a boride, carbide, oxide, nitride, silicide, oxysulfide, or sulfide of a metal the same as or other than the solvent metal matrix. It has been found that by mixing the constituents or elements of the desired second phase material with a solvent metal, and locally heating to a temperature at which substantial diffusion and/or dissolution of the reactive elements into the solvent metal can occur, typically at or close to the melting point of the solvent metal, a moving localized solvent assisted isothermal reaction, which is always exothermic, can be initiated. This solvent assisted reaction results in the extremely rapid formation and dispersion of finely divided particles of the second phase material in relatively high concentrations of the solvent metal matrix material.

It is an object of the present invention to provide a process for forming metal-second phase composite materials having a relatively uniform dispersion of second phase particulate throughout large volumes of solvent matrix metal. The process comprises localized ignition to cause in-situ precipitation of at least one second phase material in a solvent metal matrix by contacting reactive second phase-forming constituents, in the presence of a solvent metal, at a localized temperature at which sufficient diffusion of the constituents into the solvent metal occurs locally to initiate a moving isothermal reaction of the constituents to produce a porous composite material.

It is also an object of the present invention to provide a method for the production of porous metal-second phase composite material, the method comprising precipitating at least one second phase material in a substantial volume fraction of solvent metal by locally igniting reactive second phase-forming constituents, in the presence of a substantially nonreactive solvent metal in which the second phase-forming constituents are more soluble than the second phase material, at a temperature at which sufficient diffusion of the reactive second phase-forming constituents into the substantially nonreactive solvent metal occurs to cause a substantially isothermal propagating second phase-forming reaction of the constituents, to thereby precipitate second phase particles in the solvent metal so as to produce finely divided second phase particles in the solvent metal matrix.

The invention further relates to a method for the production of porous metal-second phase composite materials, the method comprising precipitating at least one seocnd phase material in a substantial volume fraction of solvent metal by locally igniting reactive second phase-forming constituents, in the presence of a substantially nonreactive solvent metal in which the second phase-forming constituents are more soluble than the second phase, at a local temperature at which sufficient diffusion of the constituents into the solvent metal occurs, to cause a substantially isothermal propagating reaction of the reactive second phase-forming constituents to increase the temperature to a temperature exceeding the melting temperature of the solvent metal, to precipitate the second phase in the solvent metal matrix.

The invention further relates to a method for dispersion of second phase dispersoids in a metallic matrix, the method comprising forming a reaction mixture of reactive second phase-forming constituents in the presence of a substantial volume fraction of at least two metals, at least one of which acts as a solvent metal in which the second phase-forming constituents are more soluble than the second phase dispersoids, raising the temperature of the reaction mixture locally to a temperature at which sufficient diffusion of the second phase-forming constituents into the lowest melting solvent metal occurs to initiate a substantially isothermal reaction of the constituents, whereby the exothermic heat of reaction of the constituents causes the temperature of the reaction mixture to exceed the melting point of the highest melting metal, permitting propagation of the reaction and dispersion of the second phase dispersoid in a metal matrix.

The invention further relates to a method for dispersion of second phase dispersoids in a solvent metal matrix, the method comprising forming a reaction mixture of reactive second phase-forming constituents in the presence of a substantial volume fraction of at least two metals, at least one of which acts as a solvent metal in which second phase-forming constituents are more soluble than the second phase dispersoids, raising the temperature of the reaction mixture locally to a temperature at which sufficient diffusion of the second phase-forming constituents into the lowest melting solvent metal occurs to initiate a substantially isothermal reaction of the constituents, whereby the exothermic heat of reaction of the constituents causes the temperature of the reaction mixture to exceed the melting point of the lowest melting point metal, permitting propagation of the reaction and dispersion of the second phase dispersoid in a mixed metal matrix.

The invention further relates to a method for dispersion of at least one intermetallic material in a metallic matrix.

The invention further relates to a method for dispersion of at least one ceramic material in a metallic matrix.

The invention further relates to a method for dispersing dispersoid particles of an intermetallic material and a ceramic material in a metal, metal alloy, or intermetallic matrix.

The invention further relates to a porous mass comprising a dispersion of in-situ precipitated insoluble second phase particles in a solvent metal matrix produced by propagating a locally ignited substantially isothermal exothermic reaction of second phase-forming constituents in the presence of a substantial volume fraction of solvent metal in which the constituents are more soluble than the second phase.

DESCRIPTION OF THE PREFERRED EMBODIMENTS

The present invention relates to a novel technique for preparing useful metal-second phase composites. Novelty resides in the process for preparing a porous solvent metal matrix-second phase master concentrate suitable for use as an intermediate in the formation of a dense composite product. Because the process relies upon the production of second phase particles which are dispersed and substantially insoluble with respect to the solvent matrix metal, the porous composite matrix can be dissolved in another metal to yield dense composite products having a uniform second phase dispersion. Resultant composites may be remelted, facilitating subsequent processing. The technique comprises the preparation of a master porous composite containing discrete dispersoid particles each substantially encapsulated or enveloped by solvent matrix metal. Thus, the discrete dispersoid particles are not bonded to each other in the concentrate. This novel technique relies upon substantial concentrations of high thermal conductivity solvent matrix metal to establish an isothermal wave front which propagates from a place of local ignition of reactive components. More particularly, a green compact of compressed reactive components, typically shaped in the form of a rod, is ignited at one end, and the substantially isothermal wave front moves along the rod to precipitate the substantially insoluble second phase material in-situ in the relatively high concentration solvent metal to form the aforementioned porous composite.

An advantage of the present invention is that such porous composites may, in turn, be utilized via an admixture process to introduce the second phase into a host metal in controlled fashion. Thus, a concentrate may be prepared in the form of a porous composite having, for example, a high percentage of a second phase, such as a ceramic, e.g. titanium diboride, in a solvent matrix metal, such as aluminum. This porous composite may then be added to a molten host metal, metal alloy or intermetallic bath, (which molten metal may be the same or different from the matrix metal of the porous concentrate) to achieve a final composite having the desired loading of second phase. Alternatively, the porous composite may be admixed with solid host metal, metal alloy or intermetallic, and then heated to a temperature above the melting point of the host metal. In the following discussion, admixture with a "host metal" or "host metal bath" should be understood to apply equally to each of the different embodiments indicated above.

The melting point of the solvent metal must be below the temperature of the host metal, and there must be sufficient miscibility of the two molten metals to insure alloying, dissolution, or combination. For example, titanium can be reinforced by precipitating titanium diboride in aluminum, and subsequently introducing the titanium diboride-aluminum composite into molten titanium to dissolve the aluminum matrix of the porous composite, thus forming an aluminum-titanium matrix having titanium diboride dispersed therein. Similarly, lead can be reinforced by precipitating titanium diboride in aluminum and admixing the composite with molten lead.

In certain instances, the "host metal" may comprise material other than conventional metals, metal alloys or intermetallics. The host metal may, for example, be a dispersion strengthened metal such as metal containing finely dispersed erbium oxide, thoria, alumina, etc., or a metal-second phase composite. It is important in these cases that the preexisting dispersion be stable in the molten metal for the time/temperature required for introducing the desired porous composite material of the present invention. The advantage of utilizing a material containing a second phase dispersion as the host metal is that a bimodal distribution of second phase types, shapes, amounts, etc. may be obtained. An example would be the use of an aluminum matrix containing a dispersion of essentially equiaxed $TiB_2$ particles, to which a porous composite of the present invention dispersed therein having needle shaped TiN particles is added. A combination of dispersion strengthening and high temperature creep resistance is obtained. In accordance with the foregoing discussion, it must be understood that suitable "host metal," or "host metal, metal alloy or intermetallic" matrices encompass the types of materials discussed above containing preexisting second phase dispersions.

The present invention encompasses several features that run directly contrary to the prior art wisdom in materials science, and particularly in the field of metal-second phase composites. These features may be more clearly understood when considered in the context of the prior art SHS processes, particularly those SHS processes employing minor amounts of binder metal. Firstly, this prior art is directed to the formation of dense products. Porous products are not considered desirable and have not been investigated. The perspective of the prior art is to develop finished dense products, i.e. products that are ready for machining or other metal working or ready for use in fabricating manufactures.

Secondly, the prior art looks to the use of a metal matrix as a binder. Contrary to the prior art, the present invention looks to the metal matrix as a solvent in which dispersoid particles that are substantially insoluble relative to the solvent metal matrix are dispersed. More particularly, the prior art utilizes relatively low concentrations of binder, whereas the present invention utilizes relatively high concentrations of metal matrix. Prior art materials utilize quantities of metal which fill voids among typically sintered ceramic particles to densify the composite.

Furthermore, prior art concentrations preclude encapsulating the dispersoid particle with binder. The concentrations utilized in the present invention, however, are sufficient to provide for substantial enveloping or encapsulation of the substantially insoluble dispersoid particles in the solvent metal matrix. This feature is advantageous over prior art in which preformed ceramic powders are combined with metals, because it inhibits the formation of deleterious coatings or layers on the particles. These coatings or layers, such as oxide layers, are frequently present in prior art metal matrix composites, and are believed to negatively affect physical properties of materials and inhibit further processing of products formed therefrom.

Next, the prior art seeks dense products involving self-bonding of ceramic particles. For example, prior art techniques seek sintering of particles, rather than encapsulation thereof to inhibit bonding of the particles. These kinds of irreversible techniques are directly contrary to the present invention, which utilizes a reversible technique, that is, an encapsulation technique which inhibits bonding of dispersoid particles and facilitates further processing.

Additionally, the higher concentrations of metal matrix, typically greater than about 30 volume percent, utilized in the present invention enhance the heat transfer characteristics of reactant combinations and cause a more uniform linear reaction rate. Additionally, there is a reduction in particle size because the maximum temperature attained is lower than attained in the prior art because of the additional heat capacity of the contained metal, and because of the more rapid quench rate resulting from the higher thermal conductivity of said metal. Another advantage is in spatial temperature uniformity, hence uniformity in size distribution of the dispersoid particles in the matrix material. Prior art techniques result in larger particles that are agglomerated and/or sintered. The smaller particle size and uniformity in distribution of particles achieved by the present invention result in improved properties of final composite products.

Another feature of the present invention which distinguishes from the prior art is the formation of an isothermal wave front which promotes the uniformity of particle size of dispersoid particles in a cross section of the product produced. The isothermal character results from the selection of a high thermal conductivity solvent metal matrix, in combination with concentrations of the solvent metal sufficient to achieve the isothermal character across the material to be reacted.

The combination of these features permits manufacture of composite materials suitable for processing via the admixture process to produce materials whose properties may be tailored to suit the demands of particular uses. This admixture process takes advantage of the fact that "poor quality" intermediate composites are recovered. Such composites would have heretofore been regarded as useless. For example, in the preparation of ceramic bodies by SHS, a limiting feature in the process as a means for producing useful ceramic shapes or parts, has been the inherently poor physical quality of the body typically formed by the self-propagating synthesis. Accordingly, attempts have been made to enhance the quality of such bodies by techniques such as elevated pressures at temperature to cause diffusion, sintering, and densification. In contrast, such properties as friability, low strength, and porosity have been found, surprisingly, to be advantageous in the process herein disclosed.

A feature in the admixture process is that molten metal may be used to advantage in the production of composites, even though it is well known in the art that molten metal should be specifically avoided in the fabrication and utilization of metals, ceramics and composites. Thus, for example, the infiltration of molten metals into conventional polycrystalline metals results in grain boundary dehesion, facilitates crack propagation, and hence causes brittleness. As a consequence, there have traditionally been problems, for example, with the containment of molten metal in metallic containers (of higher melting point) because of progressive loss of strength and integrity (the phenomenon of liquid metal embrittlement). Similarly, in the use of ceramics in molten metal contacting applications, service longevity has always been a problem owing to molten metal attack, even with the most chemically inert and resistant materials. Thus, for example, the containment of molten aluminum by titanium diboride has been a long standing, and still commercially unresolved problem, owing to penetration of the molten metal along the ceramic grain boundaries where reaction takes place with contaminants. Progressive penetration and reaction ultimately lead to loss of intergranular cohesion, mechanical weakness, and disintegration.

The presence of molten metal is equally disadvantageous in the manufacture and use of metal-second phase composites, where it has been regarded of paramount importance to avoid the introduction of molten metal. Several examples are known to illustrate the type of problems that can arise. In the preparation of composites of SiC in Al, precautions must be taken, such as proprietary coating techniques, to avoid prolonged direct contact of the molten metal and particulate (or the ceramic skeleton in the case of molten metal infiltration). Absent such precautions, the metal and ceramic react together, a process that obviously diminishes the amount of particulate reinforcement, but also generates reaction products that may render the composite extremely susceptible to subsequent corrosion. Analogous problems occur when attempts are made to weld the SiC/Al because, as the melting temperature of the matrix metal is exceeded, the same harmful reactions occur. In the case of thoria-dispersed (TD) nickel, the composite is produced via solid powder metallurgical techniques, as opposed to liquid metal (ingot metallurgy), because the thoria ceramic tends to segregate, and even rise to the surface of the melt, because of surface tension effects. As with SiC/Al, welding is again a problem because of the presence of liquid metal. this time giving rise to the above-noted segregation.

It would thus be expected that the combination of poor quality metal-second phase preforms with molten metal would not lead to the recovery of a useful product. However, it has surprisingly been found that employing these features in the admixture process invention yields unexpected and quite unobvious benefits, yielding products that had heretofore been unattainable using prior art techniques.

In addition to the novel and beneficial processing features alluded to above, other advantages derive from the isothermal, propagating in-situ second phase precipitation process of the present invention, such as clean coherent interfaces between the metal and second phase. Moreover, the admixture process allows these advantages to be achieved, while avoiding the shortcomings below, that are inherent to in-situ precipitation of a second phase in metal. Thus, for the production of fine precipitates, the process must, by necessity, avoid prolonged heating at elevated temperatures, which results in particle growth. For this reason, relatively high concentrations of dispersoid precursor are preferred in order that the brief duration of exothermic heat be sufficient to complete the in-situ formation process. In the case of higher concentrations, excessive heat is experienced, hence sintering and agglomeration of particles results. In the case of lower dispersoid concentrations, the amount and time of external heat that must be applied to complete the reaction are such that particle growth may be a problem. Thus, the range of second phase loadings that may be recovered in a product is constrained by these criteria. However, when the admixture process is used, the constraint disappears because the particle formation process may be conducted under the circumstances that most effectively lend themselves to the production of second phase of the desired morphology, size, type and other characteristics, without regard to loading level. As an example, the optimum second phase loading range may be used in the initial propagating isothermal second phase formation process. This preformed porous composite may then be combined with molten host metal in variable amounts, to provide full latitude in dispersoid concentration in the recovered final metal matrix.

The present invention is directed to a novel process for the in-situ precipitation of fine particulate second phase materials, such as ceramics or intermetallics, typical of which are refractory hard metal borides or aluminides, within metal, alloy, and intermetallic systems, to produce a solvent metal-second phase composite suitable for use as a master concentrate in the admixture process. However, the process described may also be used for introducing larger particles of a second phase material into molten host metal, up to the point at which such larger particles result in component embrittlement, or loss of ductility, etc. The improved properties of the novel final composites offer weight-savings in stiffness limited applications, higher operating temperatures and associated energy efficiency improvements, and reduced wear in parts subject to erosion. A specific use of such material is in the construction of turbine engine components, such as blades.

In this context, it should be noted that the final metal-second phase products of the present invention are also suitable for use as matrix materials, for example, in long-fiber reinforced composites. Thus, for example, a particulate reinforced aluminum composite of the present invention may be used in conjunction with long SiC or carbon fibers to enhance specific directional properties while retaining high transverse modulus. Typical fabrication routes for such materials include diffusion bonding of thin layed-up sheets, and molten metal processing.

A method is taught whereby the second phase forming elements are caused to react in a solvent metal to form a finely-divided dispersion of the second phase material in the solvent metal matrix. In accordance with the present invention, the second phase-forming constituents most easily combine at or about the melting temperature of the solvent metal, and the exothermic nature of this reaction causes a very rapid temperature elevation or spike, which can have the effect of melting additional metal, simultaneously promoting the further reaction of the second phase-forming constituents.

In systems where the reactive elements have substantial diffusivity in the solid matrix metal, the reaction may be initiated at temperatures well below the melting point of the matrix metal. Thus, a solid state initiation is possible, wherein a liquid state may or may not be achieved.

Exemplary of suitable second phase ceramic precipitates are the borides, carbides, oxides, nitrides, silicides, sulfides, and oxysulfides of the elements which are reactive to form ceramics, including, but not limited to, transition elements of the third to sixth groups of the Periodic Table. Particularly useful ceramic-forming or intermetallic compound-forming constituents include aluminum, titanium, silicon, boron, molybdenum, tungsten, niobium, vanadium, zirconium, chromium, hafnium, yttrium, cobalt, nickel, iron magnesium, tantalum, thorium, scandium, lanthanum, and the rare earth elements. Particularly useful additional intermetallic-forming elements include copper, silver, gold, zinc, tin, platinum, manganese, lithium and beryllium. Preferred second phase materials include titanium diboride, titanium carbide, zirconium diboride, zirconium carbide, zirconium disilicide, and titanium nitride.

As the solvent metal, any metal capable of dissolving or sparingly dissolving the constituents of the second phase, and having a lesser capability for dissolving the second phase precipitate may be used. Thus, the solvent metal component must act as a solvent for the specific reactants, but not for the desired second phase precipitate. The solvent metal acts primarily as a solvent in the process of the present invention, and the constituents of the second phase precipitate have a greater affinity for each other than either has for the solvent metal. Additionally, it is important that the second phase-forming reaction releases sufficient energy for the reaction to go substantially to completion. While a large number of combinations of matrices and dispersoids may be envisioned, the choice of in-situ precipitated phase (ceramic or intermetallic) in any one given matrix, is limited by these criteria.

Suitable solvent matrix metals include aluminum, nickel, titanium, copper, vanadium, chromium, manganese, cobalt, iron, silicon, molybdenum, beryllium, silver, gold, tungsten, antimony, bismuth, platinum, magnesium, lead, zinc, tin, niobium, tantalum, hafnium, zirconium, and alloys of such metals.

The host metal may be any metal in which the second phase precipitate is not soluble, and with which the second phase does not react during the time/temperature regime involved in the admixture process, subsequent fabrication, and/or recasting. The host metal must be capable of dissolving or alloying with the solvent metal, and must wet the porous composite. Thus, the host metal may be the same as the solvent metal, an alloy of the solvent metal, or a metal in which the solvent metal is soluble. When alloys are utilized, one may substantially retain the beneficial properties of the alloys, and increase, for example, the modulus of elasticity, high temperature stability, and wear resistance, although some loss of ductility may be encountered in certain soft alloys. Further, final metal matrix composites prepared from the solvent metal matrix materials of the present process may be fabricated in conventional fashion, by casting, forging, extruding, rolling, machining, etc., and may also be remelted and recast while retaining substantial uniformity in second phase particle distribution and retaining fine second phase particle size, fine grain size, etc., thereby maintaining associated improvements in physical properties.

The degree of porosity of the porous composite can be varied by procedures such as vacuum degassing or compression applied prior to, during, or subsequent to initiation of the second phase-forming reaction. The degree of vacuum applied and temperature of the degassing step is determined purely by the kinetics of evaporation and diffusion of any absorbed moisture or other gases. High vacuum and elevated temperatures aid the degassing operation. In the case of titanium, aluminum, and boron mixtures, however, the pre-reacted compact must not be exposed to temperatures above 300° C. for prolonged periods of time, as this will induce the volatilization of some components and induce the formation of titanium aluminide by solid state diffusion. This is undesirable because it forms as large plates, which are detrimental to mechanical properties, and also reduces the chemical driving force for the formation of the titanium diboride. Nonetheless, conversion of titanium aluminide to titanium diboride in the presence of boron and aluminum can occur slowly if the components are held at temperatures above the melting point of aluminum.

When vacuum degassing is applied prior to reaction, lower porosity is obtained. When vaccum is applied during reaction, the compact typically expands, resulting in a significant increase in porosity.

Absent the degassing step, the composite formed may be relatively porous, and lower in density than the matrix metal. In such a state, this material may be of a high second phase concentration and may be added to a measured volume of matrix metal (either the same or different from the matrix in which the dispersoid was first formed) to achieve a specifically desired second phase volume fraction. Relatively high concentration of the second phase in the solvent metal matrix may be achieved while retaining substantially uniform dispersion of discrete second phase particles within the solvent metal matrix.

In preparing the porous composite materials, degassing of the powders of the reactant mixture may not be necessary, and, in fact, it may be advantageous not to degas the powders, because a porous product tends to be advantageous in the subsequent addition to a host metal. It may even be desirable, in some instances, to incorporate a porosity enhancer such as a low boiling point metal, for example, magnesium in the initial reactant mixture, the enhancer volatilizing during the in-situ reaction, thereby increasing the porosity of the resultant composite.

As formed, the second phase particles of the porous composite are protected from oxide or other deleterious covering layers which form on prior art ceramic powders. The in-situ formed second phase, such as ceramic, of the present invention, uniformly dispersed within a solvent matrix metal, may be introduced into a molten host metal bath to redisperse the second phase particles of the porous composite throughout the host metal. The molten host metal of the bath may be of such composition that in-situ precipitation of the desired second phase could not occur within the bath, or could occur only with difficulty. Thus, metals other than the solvent-matrix metal may be provided with a uniform dispersion of second phase particles of submicron and larger size. The molten host metal may also be the same as the solvent metal matrix of the porous composite, but of so great a volume, as compared to the porous composite, that in-situ second phase precipitation would be difficult to effect or control. The concentration of the second phase in the porous composite need not be large, however.

It is believed that the prior art suggestions of introduction of fine second phase particles directly to a molten metal bath are technically difficult and produce metal products having less desirable properties upon solidification due to a deleterious layer, such as an oxide, which forms on the surface of each second phase particle at the time of or prior to introduction into the molten metal bath. The second phase particles of the present invention, being formed in-situ, do not possess this deleterious coating or layer. Thus, the present invention may lead to metal products having unexpectedly superior properties.

Three basic reaction modes to make porous composite have been identified in accordance with the present invention. In the first mode, the starting materials constitute individual powders of each of the solvent metal and the individual constituents of the second phase to be formed. For example, a mixture of aluminum, titanium, and boron may be compacted into a rod and ignited locally to cause an isothermal, propagating reaction wave front to consume the elements and to form a dispersion of titanium diboride in an aluminum matrix.

In the second mode of the invention, individual alloys may be reacted, one such alloy comprising an alloy of the solvent metal with one of the constituents of the second phase, and the other comprising an alloy of the same solvent metal, or another metal with which the solvent metal readily alloys, with the other constituent of the second phase. As an example of using two alloys of a common metal, a mixture of aluminum-titanium alloy with aluminum-boron alloy may be compacted into a rod and ignited locally to cause an isothermal, propagating reaction wave front to consume the elements and to form a dispersion of titanium diboride in aluminum. This alloy-alloy reaction route may, in some cases, be relatively slower than the elemental route, yet may offer economic advantages because the alloys utilized can be cheaper than the elemental powders.

The third reaction mode constitutes a combination, or intermediate, of the first two modes discussed above. Thus, one may react a premixed alloy containing one reactive species and the solvent matrix metal, with an elemental powder of the second reactive species, such as combining an aluminum-titanium alloy with elemental boron powder, compacting into a rod, and igniting locally to cause an isothermal, propagating reaction wave front to consume the elements and to form a dispersion of titanium diboride in an aluminum matrix. This reaction mode may be relatively more expensive than the alloy-alloy reaction mode, but offers a more rapid reaction, which in turn permits formation of finer particle precipitates than obtainable by the alloy-alloy route. However, the alloy-elemental powder reaction mode could be relatively less expensive, although slower, than the elemental powder mode, in most cases.

It should be noted in performing the process of the present invention that certain criteria must be met in order to produce the desired porous composite. Firstly, the heat generated by the initial local reaction of the second phase-forming constituents must be sufficient to allow the reaction wave front to propagate through the reaction mass. In addition, the heat source, such as inductively heated graphite, should supply sufficient local heat to initiate the second phase-forming reaction by, for example, locally melting solvent metal.

Both of the above criteria have a significant impact on the feasibility of different composite forming reactions performed in accordance with the present invention because the relatively high volume fractions of solvent metal in the reaction mass absorb heat and therefore tend to quench the reaction. For this reason, it can be important to preheat the reactant mass prior to local initiation of reaction. Preheating may thus permit certain non-propagating reactions to propagate, or, in the alternative, allow reactions to propagate at higher solvent metal concentrations. Other advantages to preheating include the ability to remove adsorbed gases from the reaction mass prior to initiation, and the attainment of higher maximum reaction temperatures that permit the second phase-forming reaction to go substantially to completion.

The resultant intermediate composite from any of the reaction modes mentioned above, typically a porous concentrate, may be subsequently combined with additional metal in the admixture procedure. As described earlier, this procedure yields dense composites with superior properties that combine the beneficial effects of in-situ precipitated dispersoids and molten metal processing to achieve the required loading of second phase. In one embodiment of the present invention the in-situ second phase formation process and the admixture procedure are performed sequentially without a break, or, in the alternative, are made to occur almost simultaneously. Such a procedure has obvious advantages in that intermediate materials handling operations are eliminated, and just one apparatus may be used for both processes. Typical of such a combined second phase formation and admixture procedure would be the preparation of a compacted rod of elemental boron, titanium and aluminum powders, followed by suspending the rod in such a manner as to dip the end of the rod into a bath of molten aluminum. The self propagating, substantially isothermal reaction could then be allowed to consume the second phase-forming constituents before the reacted compact is admixed with the molten metal by releasing the suspension means. Alternatively, the rod could be immersed into the molten metal essentially concurrently with the second phase-forming reaction by more rapid release of the suspension means. In the extreme, the rod might be replaced with compacted briquettes, for example, that are simply dropped into the molten metal. Accordingly, the self-propagating, substantially isothermal reaction might take place in the briquette while submerged in the melt, thereby causing essentially simultaneous formation and dispersion of second phase dispersoids.

It is particularly to be noted that the prior art teaches that the combination of elemental metal powders, or alloy powders, particularly of a coarse particulate size, would typically yield intermetallic compounds. In fact, conventional techniques for forming intermetallics involve, for example, reacting a mixture of titanium and aluminum, to form titanium aluminide, and a mixture of boron and aluminum to form aluminum diboride. Thus, one would expect that a mixture comprising powders of titanium, aluminum, and boron would yield an aggregate agglomeration of titanium aluminide, aluminum diboride, and possibly, titanium diboride. In contrast, the present invention provides for the formation of essentially just one finely dispersed precipitate from the two reactive components in a matrix of the third component. It is important that the second phase precipitate material not be soluble in the solvent metal, while the constituents of the second phase, individually, are at least sparingly soluble in the solvent metal. Thus, the exothermic dispersion reaction mechanism depends upon a certain amount of each second phase-forming constituent dissolving and diffusing in the solvent metal, and while in solution (either liquid or solid state), reacting exothermically to form the insoluble ceramic, which precipitates rapidly as a fine particulate. The solvent metal provides a medium in which the reactive elements may diffuse and combine. Once the initial reaction has occurred, the heat released by the exothermic reaction may cause additional solvent metal to melt, thereby enhancing diffusion of reactive components in the solvent metal, and completing the reaction.

The cool-down period following initiation of the reaction and consumption of the reactive constituents is believed important to achieving very small particle size, and limiting particle growth. It is known that at high temperatures, it is possible for the second phase particles to grow, or sinter together. This should also be avoided, in most cases, because of the negative effect of large particle sizes on ductility. The cool-down or quenching of the reaction is, in a sense, automatic, because once the second phase-forming constituents are completely reacted, there is no further energy released to maintain the high temperatures achieved. However, one may control the rate of cool-down to a certain extent by control of the size and/or composition of the mass of material reacted. That is, large thermal masses absorb more energy, and cool down more slowly, thus permitting growth of larger particles, such as may be desired for greater wear resistance, for example, for use in cutting tools. Fast cooling may be achieved, for example, by placing the reaction mass on a water-cooled copper substrate. This avoids the contamination typically obtained with refractory substrates such as alumina.

Initiation of the reaction is accomplished by local heating of a portion of the reaction mass, rather than heating of the entire mass. Localized heating may be achieved by electrical impulse, thermite spark, laser, etc. The preferred method is inductive heating of a graphite susceptor.

While it is unnecessary to actually reach the melting temperature to initiate the reaction, a temperature where localized melting occurs must be achieved, or where substantial diffusion of the reactive species in the solvent metal can occur. In some cases, as temperature increases it is possible for the starting constituents to diffuse into the solvent matrix metal, forming an alloy therewith having a lower melting temperature than the matrix metal. Thus, reaction initiation temperature is lowered.

Regarding impurities, the solvent metal may be alloyed in conventional manner, while in the reactive constituents, large amounts of alloying elements or impurities may cause problems in certain instances. For example, the presence of large amounts of magnesium in boron may inhibit the formation of titanium diboride in an aluminum matrix by forming a magnesium-boron complex on the surface of the boron particles, thus limiting diffusion of the boron in the matrix. However, the presence of magnesium in the aluminum does not have this effect. That is, boride forming materials in the boron itself may inhibit the desired dissolution or diffusion of the boron and its subsequent reaction to form titanium diboride. Likewise, thick oxide films around the starting constituent powders may also act as barriers to diffusion and reaction. Extraneous contaminants, such as absorbed water vapor, may also yield undesirable phases such as oxides or hydrides, or the powders may be oxidized to such an extent that the reactions are influenced.

It is noted that undesirable compounds which may be formed from the reaction of one constituent and the solvent metal during the porous composite formation process can be essentially eliminated in some instances by the addition of more of the other constituent. For example, titanium aluminide formation in the titanium diboride-aluminum porous composite may be substantially eliminated by adding boron above stoichiometric proportion prior to initiation of the second phase-forming reaction. The boron can be in the form of elemental boron, boron alloy or boron halide. It is also noted that in the admixture process, wherein composite material of the present invention is added to a molten host metal, undesirable compounds formed in the composite material by the reaction of one constituent and the solvent metal may be introduced into the melt. These undesirable compounds may be essentially eliminated by adding an additional amount of another constituent to the molten host metal. For example, titanium aluminide formed in a titanium diboride-aluminum composite material may be essentially removed from a host aluminum melt by adding additional boron to the melt. Such a boron addition also provides the benefit that any free titanium, which can adversely affect the viscosity of the melt for casting operations is converted to titanium diboride.

It is also to be noted that, in accordance with the present invention, the complex precipitation of a plurality of systems may be caused. Thus, it is possible to precipitate complex phases, such as $Ti(B_{0.5}C_{0.5})$, or alternatively, to precipitate plural second phases, such as a mixture of titanium diboride and zirconium diboride in an aluminum matrix, in accordance with the reaction:

$$Ti + Zr + 4B + Al \rightarrow TiB_2 + ZrB_2 + Al.$$

Substitution of titanium by zirconium or vice versa, is also possible, yielding complex borides of the type $(Ti,Zr)B_2$.

It is also possible to achieve a low temperature solvent assisted reaction in a metal matrix which has a high melting temperature by allowing or admixing the high melting metal with a lower melting solvent metal. This may allow for easier initiation and propagation.

In accordance with the present invention, it has been found that the powders need not be compacted prior to localized firing, but doing so allows easier diffusion and thus easier initiation. This is due to localized melting, and increased diffusion, which are possible when the powders are in close proximity.

The starting powders must be protected from extensive oxidation due to exposure to the atmosphere, as this will restrict the diffusion of the components into the solvent metal matrix, and the reaction should preferably be carried out under an inert gas to minimize oxidation at high temperatures.

In accordance with the present method, particle growth of the second phase can be controlled. As is known in the art, the elevated temperatures produced as, for example, by the exothermic reaction, will remain higher and subside more slowly for a large mass of material than for a smaller mass. These conditions of high temperature for long periods of time favor particle growth of ceramics. Thus, the formation of relatively small volume porous composites of in-situ formed ceramic will facilitate quicker cooling and limit particle growth of the ceramic phase.

The particle size of the second phase reaction product is dependent upon heat-up rate, reaction temperature, cool-down rate, crystallinity and composition of the starting materials. Appropriate starting powder sizes may range from less than 5 microns to more than 200 microns. For economic reasons, one may normally utilize larger partle size powders. It has been found that the particle size of the precipitated second phase in the matrix may vary from less than about 0.01 microns to about 5 microns or larger, dependent upon such factors as those discussed above.

It has been found that some specific reactant properties have a greater impact than powder particle size on the particle size of the second phase produced. For example, the use of amorphous boron may result in the precipitation of a finer particle size titanium diboride than does the use of crystalline boron in an otherwise comparable mixture. The precipitation of specific particle size second phase may be selectively controlled by proper control of starting composition, temperature of reaction, and cool-down rate.

In selecting the constituents and the solvent matrix metal for the composite materials produced by the above-described process, it is important that the formed second phase material have a low solubility in the molten mass, for example, a maximum solubility of 5 weight percent, and preferably 1 percent or less, at the temperature of the molten host metal. Otherwise, significant particle growth in the second phase material may be experienced over extended periods of time. For most uses of composite materials, the size of the second phase particles should be as small as possible, and thus particle growth is undesirable. When the solubility of the formed second phase material in the molten mass is low, the molten mass with dispersed second phase particles can be maintained in the molten state for a considerable period of time without growth of the second phase particles. For example, a molten mass of aluminum containing dispersed titanium diboride particles can be maintained in the molten state for three to four hours without appreciable particle growth.

One advantage of the admixture process is that the use of porous composite, particularly that having a high loading of second phase material, permits one to simply make a single batch of porous composite material. One may then produce a wide variety of final composites having different second phase loadings. Additionally, with the admixture procedure, it is possible to form the second phase material in a matrix metal which is conductive to the formation of particles of a desired type, size, and morphology, and thereafter incorporate the particles in a host metal in which such particles cannot otherwise be produced.

A further advantage of the use of the admixture concept is the fact that in the in-situ precipitation of second phase material in a solvent metal matrix, the particle size of the second phase material appears to be related to the loading level of the second phase material. For example, in titanium diboride-aluminum composites, particle size decreases with higher concentration, up to about 40-60 percent second phase material, and then the particle size increases as the concentration approaches 100 percent. Thus, for example, if the smallest possible particle size was desired in a final composite having a low second phase concentration, one could prepare a second phase-containing concentrate in the 40-60 percent concentration range of titanium diboride to yield the smallest particles possible, and thereafter admix the porous composite to the desired second phase concentration.

Thus, according to the invention, the weight concentration of the solvent metal exceeds 10 volume percent, more preferably exceeds 20 volume percent, and most preferably more than 30 percent. Also, the porosity of the product exceeds 1 percent, more preferably exceeds 10 percent, and most preferably exceeds 25 percent. The particle size of the dispersoid particles may vary from about 0.01 microns to about 5 microns, preferably from 0.1 microns to about 3 microns.

The reactants may be formed into any desired conventional shape. Typically, a rod or cylindrical green compact is used. The shaped article can be compressed in a manner known in the art. Any shape is useful that facilitates local ignition. In a conventional manner, an end of a rod is ignited and the isothermal wave front moves along the rod to its terminal end. Any conventional means for ignition can be used.

Examples 1 through 6 illustrate the production of titanium diboride second phase particles in aluminum matrices and the effects of atmosphere, compaction pressure, and preheating on reaction propagation rate.

EXAMPLE 1

Titanium, boron, and aluminum powders are ball-milled in the proper stoichiometric proportions to provide 60 weight percent titanium diboride second phase in an aluminum solvent matrix. The mixture is then packed in gooch tubing and isostatically pressed to 40 ksi, forming a compact approximately 1 centimeter in diameter by 5 centimeters long and having a density of 2.39 grams per cubic centimeter. The compact is then placed end to end with a graphite rod in a quartz tube under flowing argon. The graphite rod is heated in a radio frequency field which initiates a reaction at the interface of the compact and the rod. The reaction propagates the length of the compact at a rate of 0.77 centimeters per second. Analysis of the resultant composite mateial reveals a dispersion of substantially unagglomerated titanium diboride particles having an average diameter of approximately 1 micron in an aluminum matrix.

EXAMPLE 2

A compact containing titanium, boron, and aluminum is prepared and reacted as in Example 1, with an additional step of preheating the compact to 500° C. prior to initiation of the reaction. The reaction is observed to propagate faster than in the unpreheated compact at a rate of 1.38 centimeters per second.

EXAMPLE 3

A compact containing titanium, boron, and aluminum is prepared and reacted as in Example 2, except that the reaction is done in a vacuum rather than under flowing argon. The reaction propagates at 1.33 centimeters per second.

EXAMPLE 4

A compact containing titanium, boron, and aluminum is prepared and reacted as in Example 1, except that the reaction is done in an atmosphere of flowing helium rather than argon. The reaction is observed to propagate at a rate of 0.47 centimeters per second.

EXAMPLE 5

A compact is prepared and reacted as in Example 1, except that the mixture of titanium, boron and aluminum powders is compacted to 13 ksi rather than 40 ksi, yielding a compact having a lower density of 2.06 grams per cubic centimeter. The reaction propagates at 0.66 centimeters per second.

EXAMPLE 6

A compact containing titanium, boron, and aluminum is prepared and reacted as in Example 5, except that the reaction is done in a vacuum rather than under flowing argon. The reaction is observed to propagate at a rate of 0.44 centimeters per second.

The following example illustrates the ability to produce a composite material comprising titanium carbide second phase particles in an aluminum matrix by the process of the present invention and the subsequent addition of the composite material to molten aluminum to produce a composite of lower second phase loading.

EXAMPLE 7

239.5 grams of titanium powder, 60.3 grams of carbon black, and 200.2 grams of aluminum powder are ball-milled for 30 minutes, packed in gooch tubing, and isostatically pressed to 40 ksi, forming a green compact 1 inch in diameter by 12 inches long. The compact is placed on two water cooled copper rails in a 4 inch diameter quartz tube under flowing argon. A 1 inch by 1 inch piece of carbon placed next to one end of the compact is induction heated until an exothermic reaction is initiated at the end of the compact. Power to the induction unit heating the carbon is turned off and the reaction is allowed to propagate the length of the compact. When cool, the reacted concentrate, comprising 60 weight percent titanium carbide second phase particles in an aluminum matrix, is crushed and slowly added to molten aluminum at 770° C. while mechanically stirring. The melt is maintained at 770° C. and stirred vigorously for several minutes. The melt is then fluxed with chlorine gas for 15 minutes, skimmed, and cast. The resultant material contains approximately 7.5 volume percent titanium carbide second phase particles in an aluminum matrix.

The following example illustrates the production of a composite material comprising titanium diboride second phase particles in an aluminum matrix by the process of the present invention, including the use of boron above stoichiometric proportion. The example also demonstrates the subsequent introduction of this composite material into additional aluminum to produce a composite of lower second phase loading.

EXAMPLE 8

207 grams of titanium powder, 106 grams of boron powder (15 weight percent above stoichiometric proportion), and 200.2 grams of aluminum powder are ball-milled for 30 minutes, packed in gooch tubing, and isostatically pressed to 40 ksi, forming a green compact approximately 1 half inch in diameter by 12 inches long. The compact is placed on a water cooled copper trough in a 2 inch diameter quartz tube under flowing argon. A 1 inch by 1 inch piece of carbon placed next to one end of the compact is induction heated until an exothermic reaction is initiated at the end of the compact. Power to the induction unit heating the carbon is turned off and the reaction is allowed to propagate the length of the compact. When cool, the reacted concentrate is crushed and slowly added to molten aluminum at 770° C. while mechanically stirring. The melt is maintained at 770° C. and stirred vigorously for several minutes. The melt is then fluxed with chlorine gas for 15 minutes, skimmed, and cast. The resultant material contains approximately 10 volume percent titanium diboride second phase particles having an average size of 0.9 microns in an aluminum matrix, substantially free of titanium aluminide.

It is noted that the present invention has a number of advantages over methods taught by the prior art. For example, this invention circumvents the need for submicron, unagglomerated refractory metal boride starting materials, which materials are not commercially available, and are often pyrophoric. Further, the present invention yields a porous composite with a second phase precipitated therein, suitable for admixture with a host metal to achieve a final composite having superior hardness and modulus qualities over currently employed composites, such as SiC/aluminum. This admixture process also eliminates the technical problems of uniformly dispersing a second phase in a molten metal, and avoids the problem of oxide or other deleterious layer formation at the second phase/metal interface during processing. Final metal matrix composites prepared from the porous composites of the present invention also have improved high temperature stability, in that the second phase is not reactive with the metal matrix. Further, such final metal matrix composite can be remelted and recast while retaining fine grain size, fine particle size, and the resultant superior physical properties.

It is understood that the above description of the present invention is susceptible to considerable modification, change, and adaptation by those skilled in the art, and such modifications, changes, and adaptations are intended to be considered to be within the scope of the present invention, which is set forth by the appended claims.

We claim:

1. A porous mass comprising a substantially uniform dispersion of up to about 80 volume percent in-situ precipitated second phase particles in a solvent metal matrix, said mass produced by propagating at or below atmospheric pressure, a substantially isothermal reaction wave front of second phase-forming constituents in the presence of at least about 20 volume percent of solvent metal in which said constituents are more soluble than said second phase.

2. The dispersion as set forth in claim 1, wherein the second phase particles comprise from about 40 to about 60 percent by weight of the composite formed.

3. The dispersion as set forth in claim 2, wherein the particle size of the second phase is from about 0.1 to about 3 microns.

4. The dispersion as set forth in claim 1, wherein the second phase is titanium diboride and the solvent metal matrix is aluminum or an alloy thereof.

5. The dispersion as set forth in claim 1, wherein the second phase is titanium carbide and the solvent metal matrix is aluminum or an alloy thereof.

6. The dispersion as set forth in claim 1, wherein the second phase is titanium nitride and the solvent metal matrix is aluminum or an alloy thereof.

7. The porous mass as set forth in claim 1, wherein the porosity exceeds about 10 percent.

8. The porous mass as set forth in claim 1, wherein the porosity exceeds 25 percent.

9. The dispersion as set forth in claim 1, wherein the concentration of the solvent metal exceeds 20 percent by volume.

10. The dispersion as set forth in claim 1, wherein the concentration of the solvent metal exceeds 30 percent by volume.

11. The dispersion as set forth in claim 1, wherein the second phase particles have a particle size between about 0.1 and 3 microns.

12. The dispersion as set forth in claim 1, wherein the second phase particles are substantially encapsulated by solvent metal.

13. The dispersion as set forth in claim 1, wherein the second phase particles include titanium diboride or titanium carbide and the solvent metal matrix includes aluminum or an alloy thereof.

* * * * *